May 24, 1955
J. K. HELLER
2,708,947
RELIEF VALVE MANIFOLD
Filed May 12, 1952
2 Sheets-Sheet 1
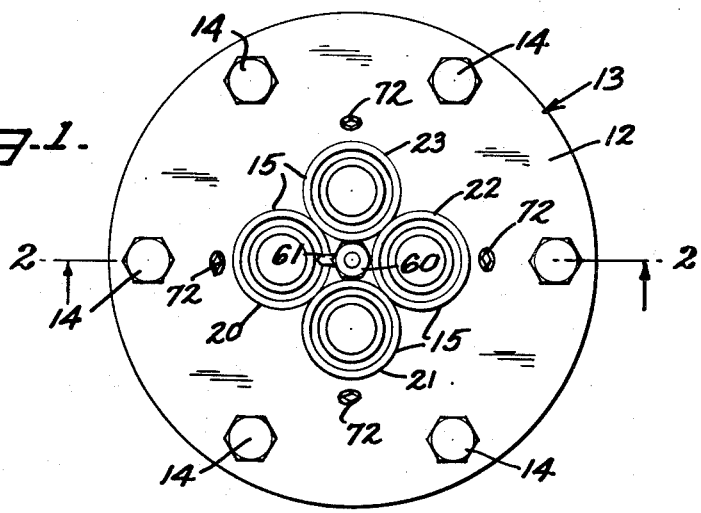
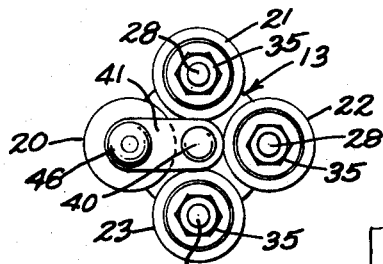
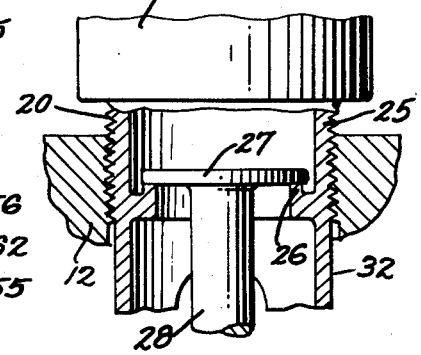
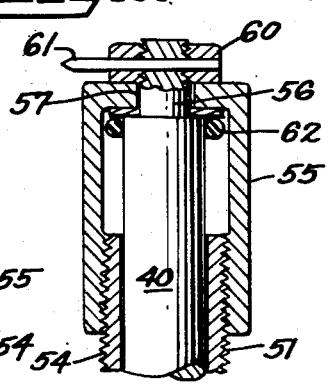
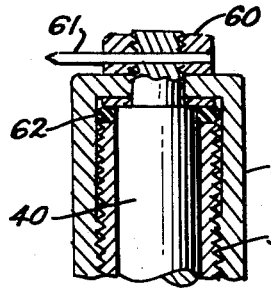
INVENTOR.
JOHN K. HELLER
BY
ATTORNEY

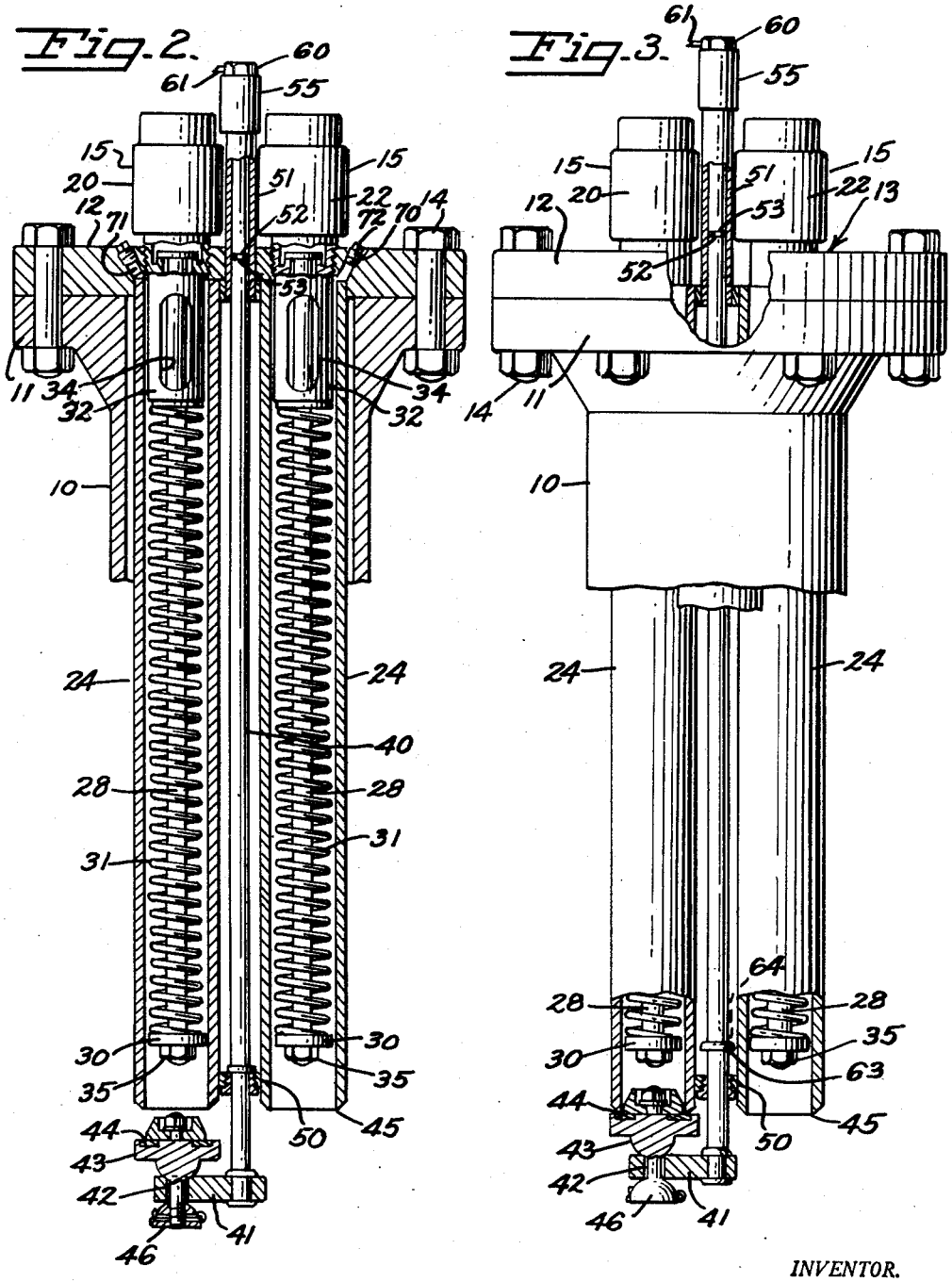

United States Patent Office 2,708,947
Patented May 24, 1955

2,708,947

RELIEF VALVE MANIFOLD

John K. Heller, Woodside, Calif., assignor to Gas Systems, Inc., Kansas City, Mo., a corporation of Missouri Application May 12, 1952, Serial No. 287,352

7 Claims. (Cl. 137—612.1)

This invention relates to an improved relief valve manifold.

The invention solves important problems in connection with the storage of gases or liquids under pressure, where it is necessary to provide relief valves to prevent excessive pressures from building up. Heretofore, whenever a relief valve has become damaged or defective in some manner and has had to be removed, the only safe solution was to drain the pressure vessel.

By means of the present invention it is possible to protect a pressure vessel while repairing or replacing a relief valve, without draining the pressure vessel or taking it out of service. The present invention provides a new type of relief valve manifold with a novel shut-off means for the relief valves therein. One more relief valve is provided than is needed to give relief at the desired pressure. For example, a pressure vessel requiring three relief valves would be equipped with four. The valve manifold is so constructed that one, but only one, relief valve can be shut off at a time. This leaves the full required relieving capacity in service while the removed relief valve is being repaired or checked.

The invention also solves the problem of checking the pressure settings of the relief valves while they are in place, without having to remove the valves or shut down or drain the pressure vessel. Previously this could not be done, and the valves could be tested only before they were installed or after they had been removed. This made it difficult to discover whether there was a faulty valve in the manifold and to learn which one, if any, was faulty, because all the valves had to be removed in order to test them. The present invention provides a plurality of removable test plugs in the manifold housing, one for each relief valve. When any one valve is being tested, that valve is closed off from the pressure vessel, and then its associated test plug is removed. Testing apparatus may then be connected directly to the relief valve. Since the valve is shut off from the pressure vessel while being tested, the test does not interfere with the conditions inside the pressure vessel.

Another feature of the present invention is that the manifold is almost entirely inside the pressure vessel so that there is the minimum possible exposure of its outlets outside the pressure vessel. This helps to prevent outside mechanical injury to the relief valves or the pressure vessel and thereby brings about increased safety.

Other objects and advantages of the present invention will appear from the following description of a preferred embodiment thereof. The details enumerated in the description are intended as illustrative of the principles of the invention but are not intended as narrow limitations on the claims.

In the drawings:

Fig. 1 is a top plan view showing a relief valve manifold embodying the principles of the present invention installed in the flange of a pressure vessel.

Fig. 2 is a view in elevation and partly in section taken generally along the line 2—2 of Fig. 1 with some portions thereof being broken open. The single shut-off valve for the relief valves is shown in its open position.

Fig. 3 is a view in elevation and partly in section generally similar to Fig. 2 but with fewer parts shown in section. In this view one of the valves has been closed off from the pressure vessel by the single shut-off valve.

Fig. 4 is a bottom plan view of the bottom portion of the device of Figs. 1 to 3.

Fig. 5 is an enlarged view in elevation and in section of the indicating mechanism and the valve operating nut at the upper end of the valve rod, in the position assumed when the shut-off valve is in the position shown in Fig. 2.

Fig. 6 is a view similar to Fig. 5 showing the position of these parts when the shut-off valve is in the position shown in Fig. 3.

Fig. 7 is an enlarged view in elevation and in section of the seat and closure member of one of the relief valves.

The pressure vessel or tank 10, only a part of which is shown, is provided with a flange 11 to which the flange or support plate 12 of the manifold 13 may be secured by bolts 14. The manifold 13 may be made of steel; for example, it may be made mainly from standard pipe fittings and machined rod stock, and may be assembled by welding or by brazing, preferably by furnace brazing.

Preferably, the entire working mechanism of the manifold 13, including all of its relief valves, is located below the upper surface of the manifold flange 12 with only the relief stacks 15 projecting thereabove. With the manifold almost entirely inside the pressure vessel, there is the minimum possible exposure to the outside and the maximum protection from mechanical injury is afforded.

If an upwardly extending discharge stack is desired, so that the gas will pass into the air at a higher level, this can most readily be provided by using a single light metal tube with an inside diameter that will fit snugly around the nest of relief valves. This tube could be ordinary stove pipe of the proper diameter. Such a light-weight discharge stack, if struck by any object, will communicate no dangerous stresses to the relief valves or to the manifold. This is preferable to the alternative use of pipe extensions screwed into the outlets of the relief valves (as has been standard practice heretofore), because rigid pipe fittings increase the hazard of external mechanical injury, transmit external forces, and tend to cause injury to the valves.

Depending on the rated pressure of the tank 10 and on the individual pressure ratings of each relief valve, any number of relief valves may be provided in the manifold. The drawings show a manifold 13 in which three relief valves would be sufficient to give the required relieving capacity; consequently, four valves 20, 21, 22, and 23 are provided, so that when one valve is removed from service, the desired relieving capacity will still be available. The number of valves in any case would, of course, never be less than two, so that when one is removed, at least one valve will still remain in operation; but any number greater than two may be used, so long as there is one more valve than the number required by the pressure conditions in the tank 10.

The four identical valves 20, 21, 22, and 23 shown in the drawings are merely illustrative, for other types of relief valves may be used. Each valve 20, 21, 22, 23 is largely enclosed in its relief stacks 15 and a long hollow tube or jacket 24 secured to the flange 12, preferably permanently, as by welding. Each stack 15 is provided with a threaded portion 25, which is threaded into the flange 12, a depending spacing portion 32, and an interior valve seat 26 (see Fig. 7). A valve closure member 27 is normally closed against the seat 26 with its long stem 28 depending down inside the tube 24.

At the lower end of the stem 28 is a collar 30, on which is mounted a spring 31 whose upper end engages the hollow tubular depending spacing portion 32 of the stack 15. The portion 32 surrounds the stem 28 and has preferably perforations 34 through its walls. The collar 30 may be adjusted on the lower end of the stem 28 by a nut 35, so as to increase or decrease the pressure of the spring 31. This adjustment changes the pressure at which the valve closure member 27 will open, since the valve 20 is opened when the upward pressure of the fluid on the closure member 27 forces it away from its seat 26, and since this pressure must overcome the pressure of the spring 31 in order for the relief valve to open.

During normal operation all four of the valves may be opened or one of them may be closed off, and during this time the springs 31 will hold their respective valves 20, 21, 22, 23 closed except when excessive pressure is encountered. Although a particular type of valve has been described, it should be noted that, so far as the present invention is concerned, relief valves having other types of seating arrangements compatible with the invention may be employed.

The means for closing off any one—but only one at a time—of the relief valves 20, 21, 22, 23 includes an elongated rod 40 extending down through the center axis of the manifold 13, the relief valves 20, 21, 22, 23 being located around the rod 40 and equidistant therefrom. On the lower end of the rod 40 is a single arm 41 having a perforation 42. A closure member 43 with a soft seat 44 is mounted on the arm 41 and is adapted to seal off the lower end 45 of any one of the tubes or jackets 24. Only one of these closure members 43 is provided, so that only one of the valves 20, 21, 22, 23 can be closed off at a time. Preferably the depending stem 46 of the member 43 fits in the perforation 42 with sufficient clearance so that the closure member assembly 43 can center itself while seating, automatically compensating for any irregularities.

A guide spider 50 secured to the jackets 24 may guide and center the rod 40 near its lower end, and an elongated guide tube 51 secured to the flange 12 positions its upper end, so that the rod 40 remains in substantial vertical alignment at all times. Leakage up around the rod 40 is prevented by an O-ring seal 52 that fits in a groove 53 in the upper portion of the rod 40 and seals against the guide tube 51.

The outer surface of the upper end of the guide tube 51 is threaded at 54, and a tubular valve-operating nut 55 is threaded thereon. A reduced upper end 56 of the rod 40 extends up through an opening 57 in the nut 55. A selector nut 60 and a pointer 61 are secured to the rod end 56, as by threading, to indicate the rotational position of the arm 41. Since the pointer 61 and arm 41 are aligned at all times, the operator can tell the position of the closure member 43 and can set it to close off any valve 20, 21, 22, 23 he pleases.

Leakage through the opening 56 may be prevented by a final seal O ring 62 (see Figs. 5 and 6). Whenever the valve operating nut 55 and selector nut 60 are removed, as for replacement of the O ring 62, a snap ring 63, fitted in a groove 64 prevents the rod 40 from falling beyond the point where the ring 63 engages the spider 50.

In order that the relief valves' pressure settings may be checked while the valves are in place, a plurality of test openings 70, one for each relief valve, are bored angularly through the flange 12 into a recess 71 adjacent the upper end of the jacket 24. A test plug 72 normally closes the opening 70 to prevent leakage therethrough.

When it is desired to remove or to test one of the relief valves, e. g., the valve 20, the valve must first be shut off. By turning the valve rod 40 until the pointer 61 points to the center of the valve 20, the closure member 43 will be directly below the jacket 24 of the valve 20. The selector nut 60 may be held to prevent it from turning while moving the valve operating rod 40. Next the valve operating nut 55 is turned counterclockwise to raise the valve rod 40 and seat the closure member 43 against the open end 36 of the jacket 24. This effects a change from the positions illustrated in Figs. 2 and 5 to those of Figs. 3 and 6. Then the relief valve 20 may be taken out by unthreading the portion 25 of the stack 15. Removal of the stack 15 includes, of course, removal of the valve seat 26 and the spacer 32, which are integral with the stack, and also carries with it the removal of the valve closure member 27 and its stem 28, together with the collar 30 and the spring 31. When the parts have been removed, they may be separated for repair and replacement.

When the relief valve is reinstalled and it is desired to put it back into service, the valve operating nut 55 is turned clockwise to lower the rod 40, thereby withdrawing the closure member 43 from the open end of the jacket 24. This returns the device from its position of Figs. 3 and 6 to its position of Figs. 2 and 5. Normally the device will be left with the valve operating nut 55 screwed down into the position shown in Fig. 2 so that all the relief valves 20, 21, 22, 23 will be in service. When the valve operating nut 55 is screwed down into the position of Fig. 2, the final seal O ring 62 will be seated—as shown in Fig. 5.

When it is desired to check the pressure setting of one relief valve, e. g., the valve 20, the valve rod 40 is moved so that its closure member 43 closes off the lower end of the jacket 24 of the valve 20; then the test plug 72 is removed and some pressure means (not shown) and gauge (not shown), or some other testing equipment, may be put in the opening 70 in place of the plug 72. When a fluid under pressure is introduced through the test opening 70, the gauge (not shown) will indicate the pressure at which the relief valve opens. When the testing is completed, the test plug 72 may be replaced, and the relief valve 20 put back into service.

Since only one relief valve is shut off at a time, there is no interruption in the safe operation of the pressure vessel when one of the valves is tested or is removed or replaced.

I claim:

1. A relief valve manifold comprising a flange, a plurality of relief valve jackets, having an inlet opening on one side of said flange and an outlet opening on the other side of said flange, said inlet openings being equidistant from a common center; a relief valve in each said jacket normally closing the passage between said inlet and outlet openings; a rod extending through said flange with an axis that substantially coincides with said common center, said rod being mounted for rotation and for axial movement with respect to said flange; a single closure means extending out from said rod and adapted to be seated against any inlet opening; and means for moving said rod axially so as to close or open an opening selected by the rotational position of said rod.

2. A relief valve manifold comprising a manifold housing, a plurality of relief valves in said housing, each contained in a separate jacket having an outlet opening and a single inlet opening therethrough, said jackets being disposed with their inlet openings equidistant from a common center; a rod extending axially along said common center and mounted for rotation in said manifold housing and for axial movement in said housing; a single jacket closure means secured to said rod and adapted to be seated against the inlet opening of any said jacket to close it off so that its relief valve is removed from service; and means for raising and lowering said rod axially to close said closure means against any said inlet opening after said closure means has been rotationally aligned with that said inlet opening.

3. The device of claim 2 in which said manifold housing is drilled to provide a passageway from the interior of each relief valve to the outside of said housing, and in which removable means are provided for closing said passageway, said passageway being adapted for testing its said relief valve without withdrawing the same from said housing.

4. A relief valve manifold for a pressure vessel, including in combination a manifold support means adapted to close an opening in said pressure vessel; a plurality of relief valves extending out through said support means, each mounted in a tubular jacket, each said jacket having an inlet opening at its lower end adapted to communicate with the interior of said pressure vessel, said openings being located equidistant from a common center; a rotatable rod extending through said manifold housing with its axis corresponding substantially to the common center for said valve jacket openings, said rod being movable along its axis and movable rotationally; a single closure means secured to the lower end of said rod and adapted to be seated against the lower end of any one of said jackets, according to the rotational position of said rod, and adapted when raised thereagainst to close said opening and to shut its contained relief valve off from said pressure vessel; an indicator means secured to the outer end of said rod outside said manifold support means to indicate the rotational position of said rod, so that said closure means may be aligned with any one of said jacket openings; a first tube secured to said manifold support means and projecting upwardly therefrom, said tube surrounding a portion of said rod and acting as a guide means therefor and having a threaded outer surface; and a second tube rotatably secured to the upper end of said rod and threaded to engage the threads of said first tube for thereby raising and lowering said rod so as to move said closure means against or away from a jacket opening with which it is aligned.

5. The device of claim 4 in which said manifold support means is bored to provide a plurality of separate passageways connecting the interior of each said relief valve with the outside of said manifold, for the testing of said relief valve, and removable means for normally closing said passageway.

6. A relief valve manifold comprising a manifold housing, a plurality of relief valve jackets, each having a single inlet opening and outlet means, said jackets being disposed with their single openings equidistant from a common center; a pressure relief valve in each jacket between said inlet opening and said outlet means; a rod whose axis coincides substantially with said common center and mounted for rotational and axial movement; means for rotating said rod; means for moving said rod axially; a single jacket closure means secured to said rod and adapted to be seated against the single inlet opening of any said jacket to close it off so that its relief valve is removed from service when said rod is moved to the proper rotational and axial position.

7. A relief valve manifold comprising a plurality of relief valve jackets, each having an inlet opening and an outlet opening, said inlet openings being equidistant from a common center; a relief valve in each said jacket, normally closing the passage between said inlet and outlet openings; a rod whose axis substantially coincides with said common center, said rod being mounted for rotational and for axial movement; a single closure means extending out from said rod and adapted to be seated against any inlet opening; and means for moving said rod axially so as to close or open the opening selected by the rotational position of said rod.

References Cited in the file of this patent

UNITED STATES PATENTS

| | | |
|---|---|---|
| 2,292,963 | Nardone | Aug. 11, 1942 |
| 2,522,406 | Smith | Sept. 12, 1950 |
| 2,538,335 | Shields | Jan. 16, 1951 |
| 2,581,878 | Pick | Jan. 8, 1952 |